Figure 2:
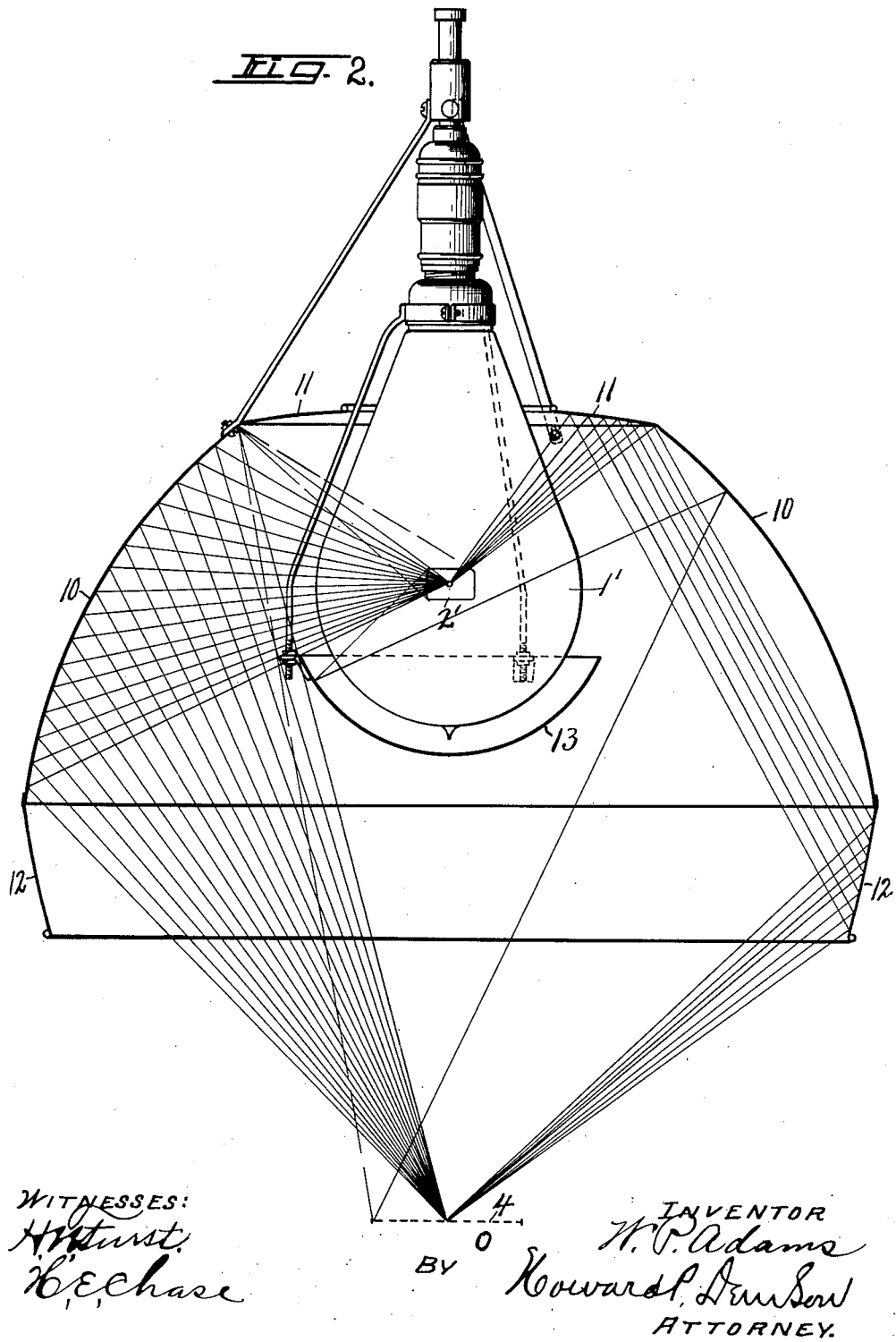

W. P. ADAMS.
LIGHT PROJECTING APPARATUS.
APPLICATION FILED JULY 15, 1914.
1,163,192.
Patented Dec. 7, 1915.
2 SHEETS—SHEET 1.
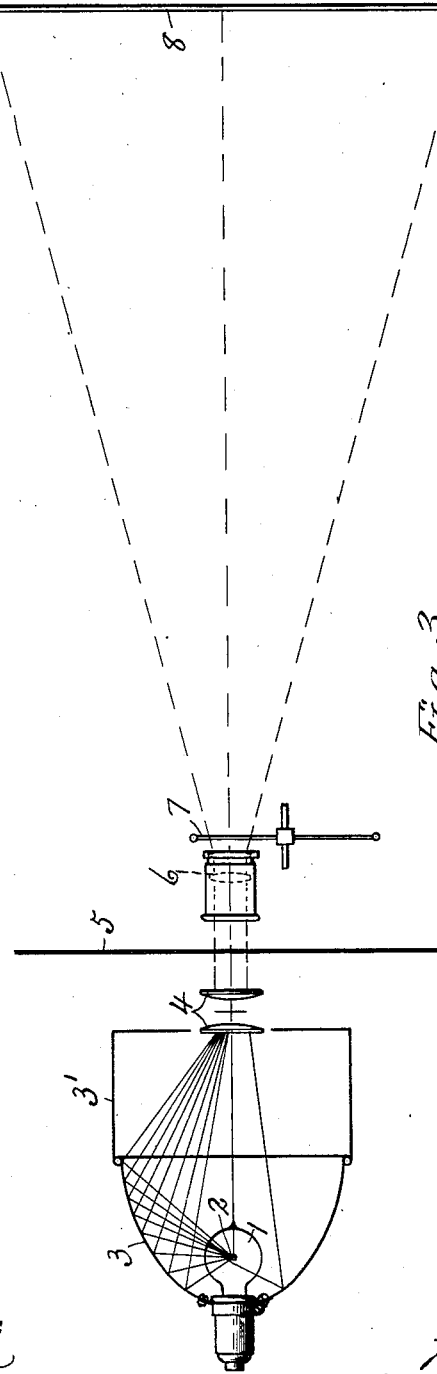
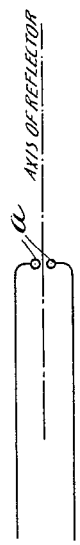

W. P. ADAMS.
LIGHT PROJECTING APPARATUS.
APPLICATION FILED JULY 15, 1914.

1,163,192.

Patented Dec. 7, 1915.
2 SHEETS—SHEET 2.

WITNESSES:
H. H. Hurst
H. E. Chase

INVENTOR
W. P. Adams
BY Howard P. Denison
ATTORNEY.

UNITED STATES PATENT OFFICE.

WALDO P. ADAMS, OF SYRACUSE, NEW YORK.

LIGHT-PROJECTING APPARATUS.

1,163,192. Specification of Letters Patent. Patented Dec. 7, 1915.

Application filed July 15, 1914. Serial No. 851,100.

*To all whom it may concern:*

Be it known that I, WALDO P. ADAMS, a citizen of the United States of America, and a resident of Syracuse, in the county of Onondaga, in the State of New York, have invented new and useful Improvements in Light-Projecting Apparatus, of which the following, taken in connection with the accompanying drawings, is a full, clear, and exact description.

This invention relates to certain improvements in light projecting apparatus, particularly useful in connection with cinematograph "motion picture", stereopticons and analogous apparatus involving the projection of photographic, printed matter, &c., upon a limited field of vision, as a screen or wall.

The main object is to obtain the requisite degree of luminosity upon the screen or field of vision in uniform density, from a relatively small amount of light source energy as compared with that required for an electric arc lamp as at present in universal use, and at the same time to eliminate the cause of excessive eye-strain incidental to the use of such electric arc lamp, which, it is well-known, constantly varies in stability and intensity of illumination, thereby producing on the screen defects such as are due to flashes, flares, glimmerings and scintillations of light. In other words, I have sought to make use of an especially designed type of incandescent electric lamp, as a source of light in this art and to tremendously multiply and increase the beam candle power of light emanating therefrom by reflection, and at the same time thereby converging and concentrating the total rays of light so reflected and emanating from the lamp as to result in the production of the requisite degree of luminosity on the screen or field of vision, free from stria or other shadowy or spotty effects present in the use of the ordinary incandescent electric "filament" lamp, due to the magnified reflection on the screen of the tenuous-drawn thread or stria-like structure of the standard incandescent lamp filament and lamp mechanism which, hitherto, has practically prohibited the use of incandescent electric lamps, as a source of light, in this art.

Other objects and uses relating to specific parts of the apparatus will be brought out in the following description.

In the drawings—Figure 1 is a diagrammatic view of the essential elements of the light projecting apparatus involving one form of my invention in which the nucleofugal rays emanating from a nucleated source of light are concentrated upon a condenser medium mainly by reflection and partly by direct projection. Fig. 2 is a sectional view, partly in elevation, of another form of the same invention in which the rays from a nucleated source of light are totally reflected and the re-reflected rays emanating from the electric lamp are converged within the relatively small area of ordinary condenser mediums. Figs. 3 and 4 are detail views of a filament as actually used in the lamp to produce a fixate nucleate of light.

The apparatus shown in Fig. 1 comprises an incandescent lamp —1— with means of producing its incandescence in a concentrated or nucleiform body of light —2—, located in and uniformly around the focal center of an especially designed reflector —3— capable of converging all of the reflected light emanating from the lamp upon a light condenser medium or lens —4—, placed within the lines of the converged light so that when used in connection with a standard motion picture projector machine the total rays of reflection and emanation will be transmitted by the condenser through the film matter, power lens and shutter upon the field of vision or screen in the requisite degree of luminosity.

The film —5—, power lens —6—, shutter —7— and screen —8— are shown in the drawing for convenience. The open end of the reflector —3— is provided with a non-reflecting extension or shield —3'— to confine spilled light.

As previously stated, the means of producing incandescence in an electric lamp used as a source of light is such as to create a concentrated nucleated body of light capable of maintaining a fixed position concentrated in and uniformly around the focal axis of the reflector, which radiates light from all points except those which are radiated directly along the focal axis and is capable of converging along with the direct radiations all of the reflected rays emanating from the electric lamp upon a light condenser medium.

The curvature of the reflector (Fig. 1) is approximately that of a true parabola except that the ordinates which determine the curvature are sufficiently greater than those of the true parabola of the same length of axis to cause the reflected rays to be projected in converging lines instead of in parallel lines as would be the case in a true parabola, but instead of allowing these concentrated rays to converge, they are intercepted by the said condenser, which transmits the total rays of reflection and emanation in concentrated form of light of maximum beam-candle-power obtainable from such a source.

The area, size and form of the reflector (Fig. 1) are such as to collect and reflect the rays radiating from the nucleated incandescent body resulting in a tremendously multiplied and increased beam-candle-power as compared to the initial candle power of the incandescent lamp used as a source of light so that the volume of light when projected in connection with cinematograph motion pictures or stereopticon effects is sufficient to clearly define the projected matter upon the field of vision, such as the screen used in this art.

An even diffusion of all light emanating from the incandescent electric lamp used as a source of light may be augmented by imparting to the reflector surface a sand-blast effect, thereby creating an innumerable number of infinitesimally small reflectors. In a like manner and for the same reason, the condensing lenses may be constructed or treated so as to produce a sand-blast effect or may be etched or colored in such manner as to further contribute to the diffusion or equalization of intensity of light transmitted therethrough so that the resultant beam of light will produce an even luminosity upon the screen and the projected objects more clearly defined and at the same time eliminate from the field of vision the causes of excessive eye-strain previously referred to.

In Fig. 2 I have shown a preferred system of reflection adapted to be used in combination with an incandescent lamp as herein described and a light condensing medium for producing an indirect lighting effect. The reflecting mediums here shown comprise a main reflector —10— having auxiliary reflectors —11— and —12— located respectively at the base and open end of the reflector, and an intercepting reflector —13— located in the front of the lamp —1'—.

The curvature of the main body —10— of the reflector is similar to that shown in Fig. 1, in that it approximates that of a parabola and is made to converge the reflected rays of light upon the condenser.

The nucleated light of the incandescent lamp is located in and around the focal center of the main reflector —10— which is so arranged that it receives the greater portion of the rays emanating from the said lamp and reflects such rays by converging them upon a suitable condenser —4—.

The auxiliary reflectors —11— and —12— are connected respectively to the rear and front ends of the main reflector —10— and are so relatively constructed and arranged that the rays of light from the source —2'— falling upon the reflector —11— will be reflected to the reflector —12— and converged upon the condenser the same as those which are reflected from the main reflector —10—.

The reflector —13— is located in front of the concentrated nucleated incandescent light —2'— and is so constructed as primarily to intercept the direct rays from said filament and also to reflect back upon the main and auxiliary reflectors —10— and —11—, from which they converge, as hereinbefore described.

Owing to the fact that the light is radiated in all directions from the nucleated source of light, there will be an almost unlimited dispersion of the reflected rays within the area of reflection resulting in a diffusion or uniformity of flux density of light for transmission through the condenser medium.

The reflector —13— not only serves to eliminate all shadowy or spotty effects such as would result from the direct and the directly reflected rays emanating from the source of light, but also contributes in producing the resultant equalization of light above referred to.

In both Figs. 1 and 2, the lamp is shown in a horizontal position, but I do not limit myself to such position as obviously the position of the lamp would depend upon its physical structure.

In Fig. 3, I have shown a portion of an incandescent lamp circuit having extremely small metallic incandescing terminals or electrodes —a— closely juxtaposed, but sufficiently separated to produce a steady fixed point of light, as —b— of extremely high intensity.

What I claim is—

1. In a light-projecting apparatus, in combination with a reflector, an incandescent electric lamp having its means of producing incandescence consisting of two minute metallic lobes spaced apart adjacent to the focus and at opposite sides of the axis of the reflector producing a nucleate arc of absolute light of high intensity at a fixed point in said axis.

2. In a light-projecting apparatus, in combination with a reflector, an incandescent electric lamp having terminals of incandescing material in spaced relation producing a fixate nucleate of light adjacent the focus of the reflector.

3. In a light-projecting apparatus, in combination with a focusing reflector, an incandescent electric lamp having terminals of incandescing material in spaced relation producing a fixate nucleate of light adjacent the focus of the reflector.

4. In a light-projecting apparatus, in combination with a concentrating reflector, an incandescent electric lamp having fixed terminals of incandescing material in spaced relation to the axis of the reflector producing a fixate nucleate of light adjacent to the focus thereof.

5. In a light-projecting apparatus, in combination with a converging reflector, an incandescent electric lamp having terminals of incandescing material in spaced relation producing a fixate nucleate of light adjacent to the focus of the reflector, and a rearwardly directed reflector in front of said incandescent electric lamp.

6. In a light-projecting apparatus, in combination with a concentrating reflector, an incandescent electric lamp having fixed terminals of incandescing material in spaced relation to the axis of the reflector producing a fixate nucleate of light adjacent to the focus of the reflector, and a lens co-axial with the reflector.

7. In a light-projecting apparatus, in combination with a concentrating reflector, an incandescent electric lamp having terminals of incandescing material in spaced relation to the axis of the reflector producing a fixate nucleate of light adjacent to the focus of the reflector, a rearwardly directed reflector in front of said incandescent lamp, and a lens in the focal axis of the first-named reflector and in front of the rearwardly projecting reflector.

8. In a motion picture projection machine, means for producing a steady light of uniform intensity upon the field of vision, comprising an incandescent electric lamp having its filament located in the produced axis of the condenser lens of the machine, a co-axial reflector at the rear of the lamp filament for diverging its directed reflected rays forwardly, a second reflector co-axial with said axis for converging its reflected divergent rays forwardly within the area of and upon the condenser, a third reflector in front of the lamp filament and also co-axial with said axis for reflecting direct rays of the lamp rearwardly, and a fourth reflector co-axial with the previously named reflectors for reflecting and converging direct rays of the lamp and also the reflected rays of the third reflector forwardly within the area of and upon said condenser.

In witness whereof I have hereunto set my hand this 6th day of July, 1914.

WALDO P. ADAMS.

Witnesses:
 H. E. CHASE,
 VIOLA HOWLAND.